United States Patent [19]

Ahlen et al.

[11] 4,142,425

[45] Mar. 6, 1979

[54] MULTIPLE SPEED DOUBLE PLANETARY GEAR TRANSMISSION

[75] Inventors: Karl G. Ahlen, Bromma; Per-Olof Bergstrom, Ektorp; Joseph Supanich, Stockholm, all of Sweden

[73] Assignee: S.R.M. Hydromekanik Aktiebolag, Stockholm-Vallingby, Sweden

[21] Appl. No.: 718,015

[22] Filed: Aug. 26, 1976

[30] Foreign Application Priority Data

Jan. 29, 1976 [GB] United Kingdom ............... 3572/76
May 10, 1976 [DE] Fed. Rep. of Germany ....... 2619500

[51] Int. Cl.$^2$ ........................................... F16H 57/10
[52] U.S. Cl. ........................................ 74/760; 74/761; 74/766; 74/767; 74/768; 74/769; 192/85 CA
[58] Field of Search ............... 74/760, 761, 766, 767, 74/768, 769, 740, 753; 192/85 CA

[56] References Cited

U.S. PATENT DOCUMENTS

| | | | |
|---|---|---|---|
| 686,471 | 11/1901 | Ough et al. ..................... | 74/761 |
| 1,654,432 | 12/1927 | Rowledge ........................ | 74/766 |
| 2,214,335 | 9/1940 | Kurti .............................. | 74/761 |
| 2,466,320 | 4/1949 | Lawrence ........................ | 74/761 |
| 2,625,057 | 1/1953 | Kelbel ............................ | 74/761 |
| 2,890,603 | 6/1959 | Harris et al. .................... | 74/760 X |
| 2,971,385 | 2/1961 | Miller ............................ | 74/761 X |
| 3,144,788 | 8/1964 | Wickman ........................ | 74/767 X |
| 3,412,834 | 11/1968 | Root .............................. | 192/85 CA |
| 3,424,034 | 1/1969 | Wickman ........................ | 74/761 |
| 3,799,003 | 3/1974 | VanDest ......................... | 74/767 X |

FOREIGN PATENT DOCUMENTS

| | | | |
|---|---|---|---|
| 701435 | 12/1940 | Fed. Rep. of Germany ............. | 74/760 |
| 927278 | 9/1947 | France ................................. | 192/85 CA |
| 45687 | 7/1908 | Switzerland ......................... | 74/760 |

*Primary Examiner*—Samuel Scott
*Assistant Examiner*—Carl F. Pietruszka
*Attorney, Agent, or Firm*—Larson, Taylor & Hinds

[57] ABSTRACT

A multiple speed gear transmission includes a pair of planetary gear arrangements connected in series, the output of the first connected to the input of the second. Each such planetary gear arrangement includes on the shafts of its planets, at least two different gear surfaces of different diameters, and in one embodiment three such gear surfaces are provided. A drive annular gear connects the input of each such arrangement to one of the gear surfaces; and at least two annular gears, i.e. sun gears or ring gears, are further connected with each planet gear for providing different forward drives and/or reverse drive. The planet carrier is connected to the output member of each arrangement. A direct drive clutch is provided for connecting the drive annular gear directly to the planet carrier for direct drive. In one embodiment the drive annular gear of the first arrangement is a ring gear and the drive annular gear of the second arrangement is a sun gear. In another embodiment, the drive annular gears of both arrangements are ring gears.

25 Claims, 6 Drawing Figures

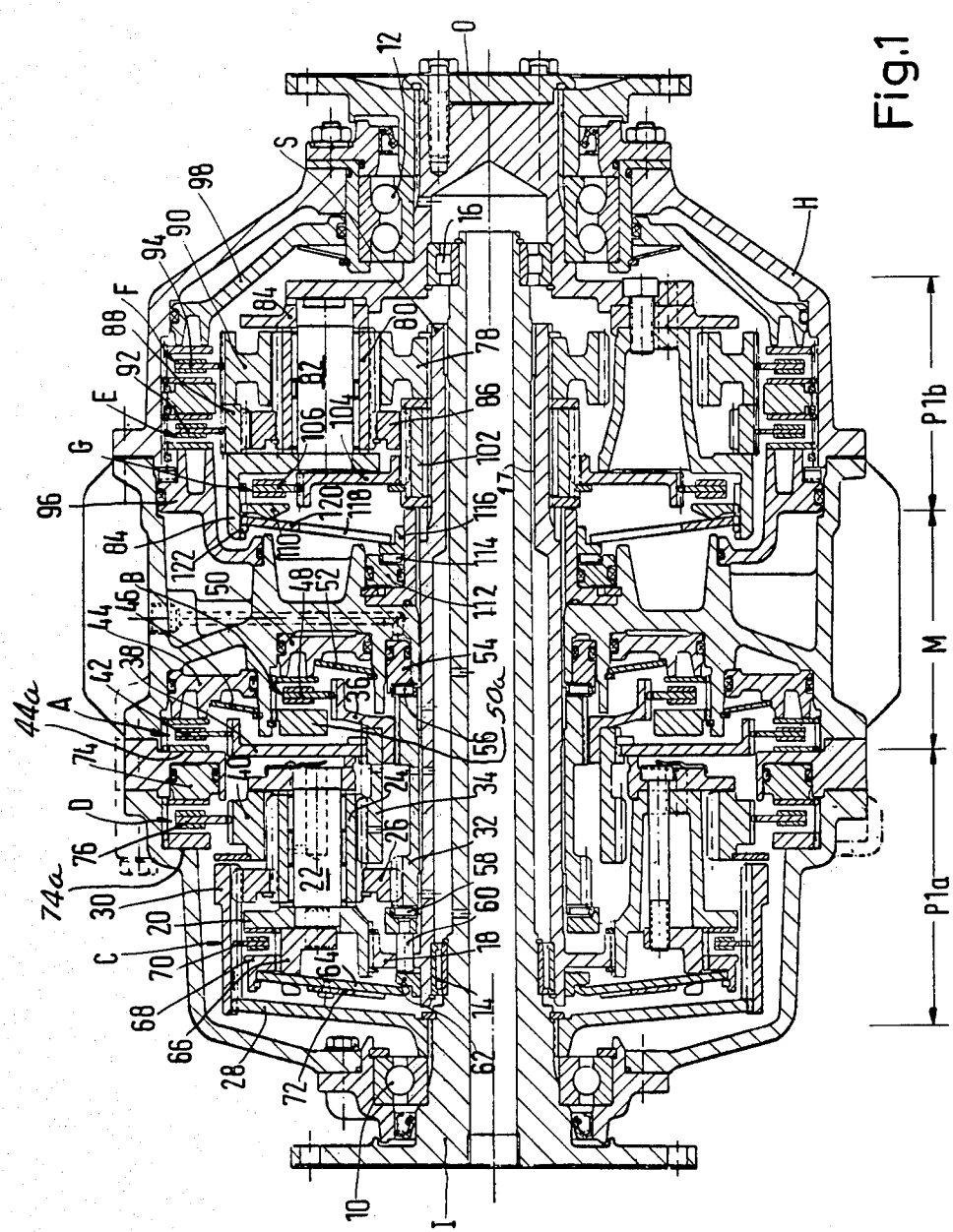

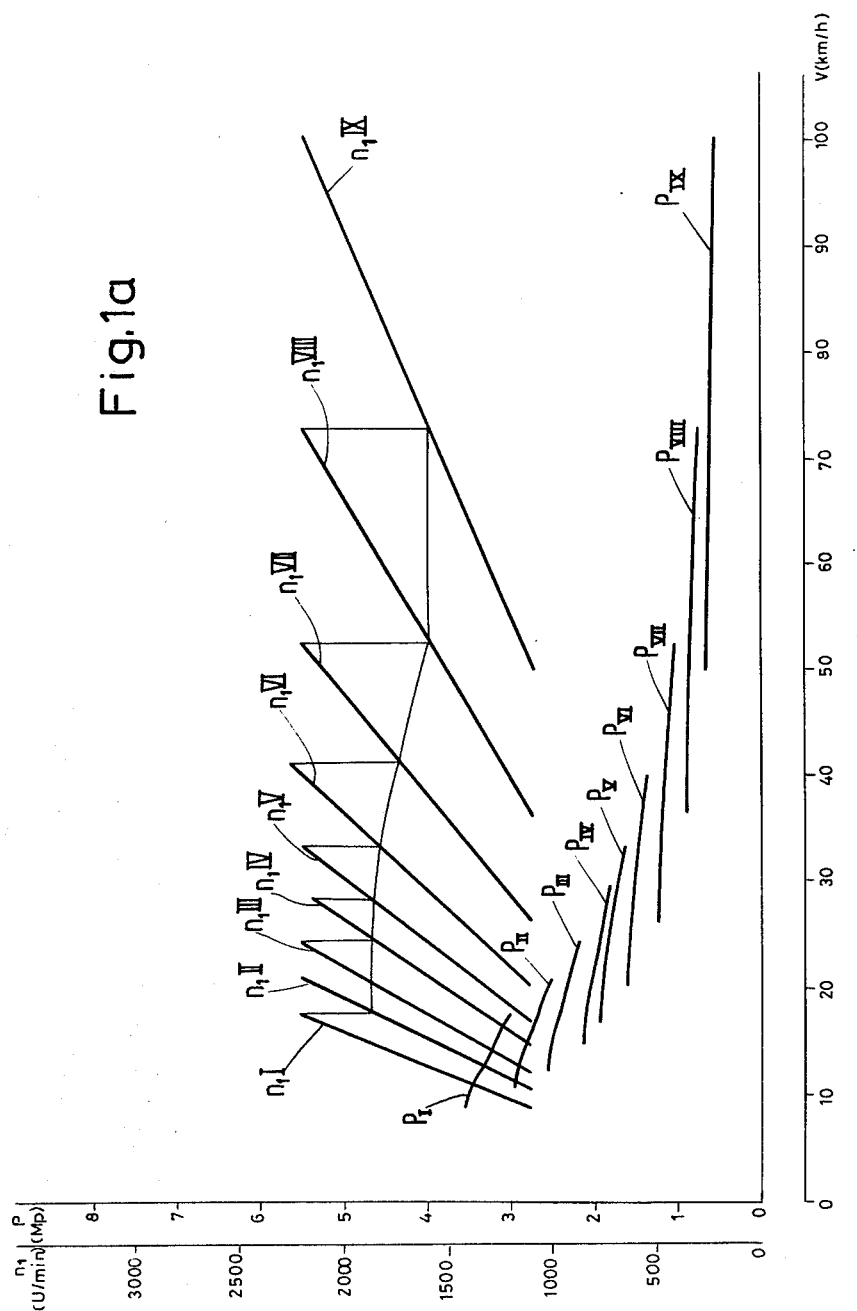

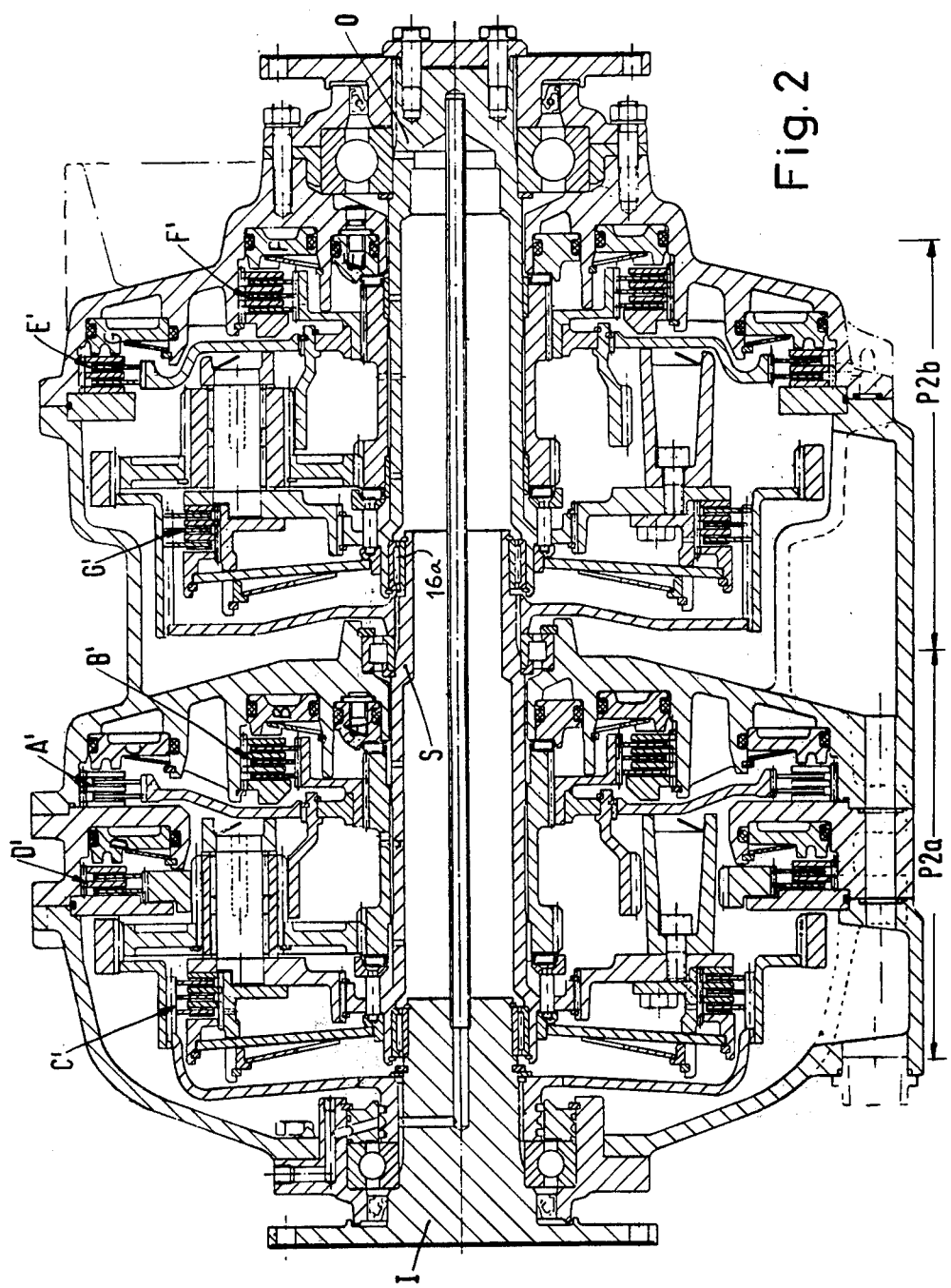

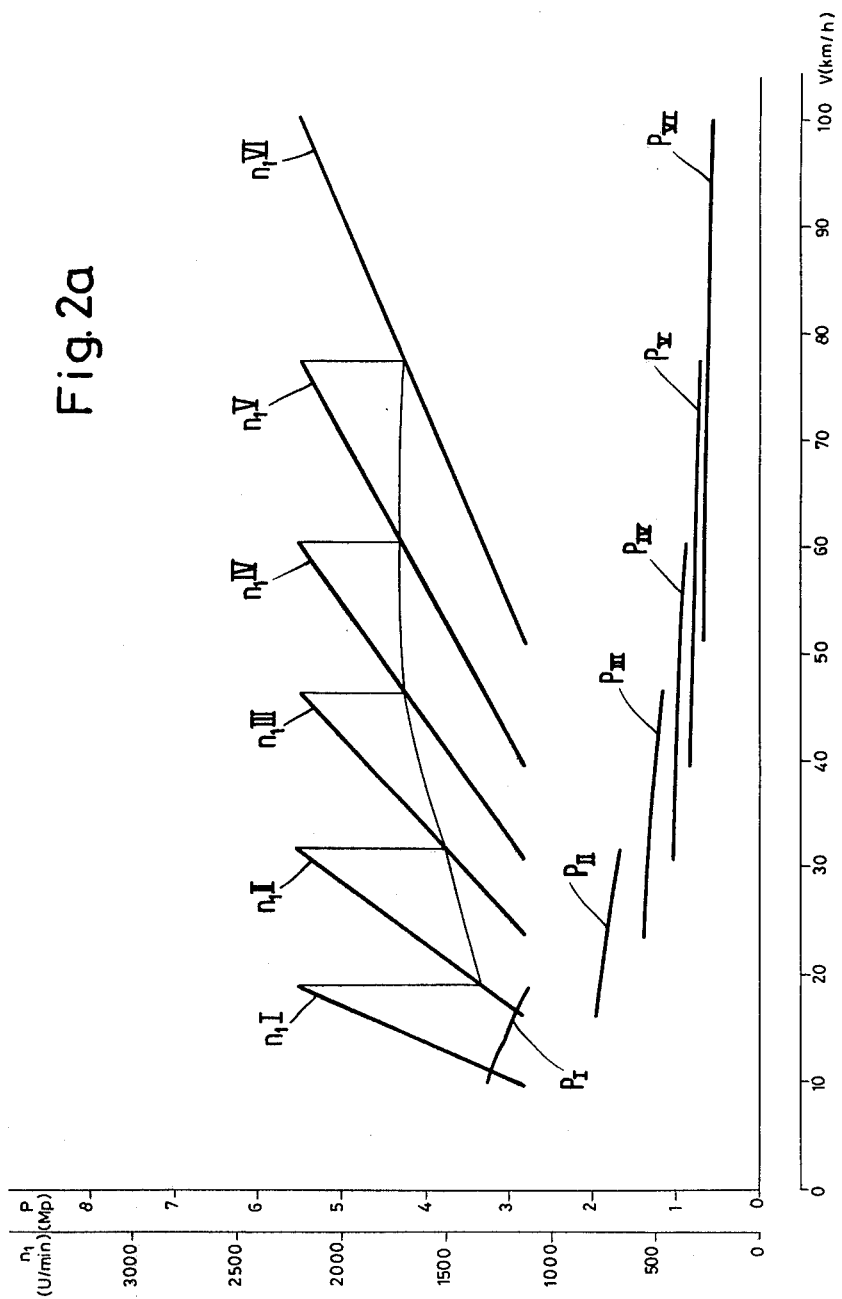

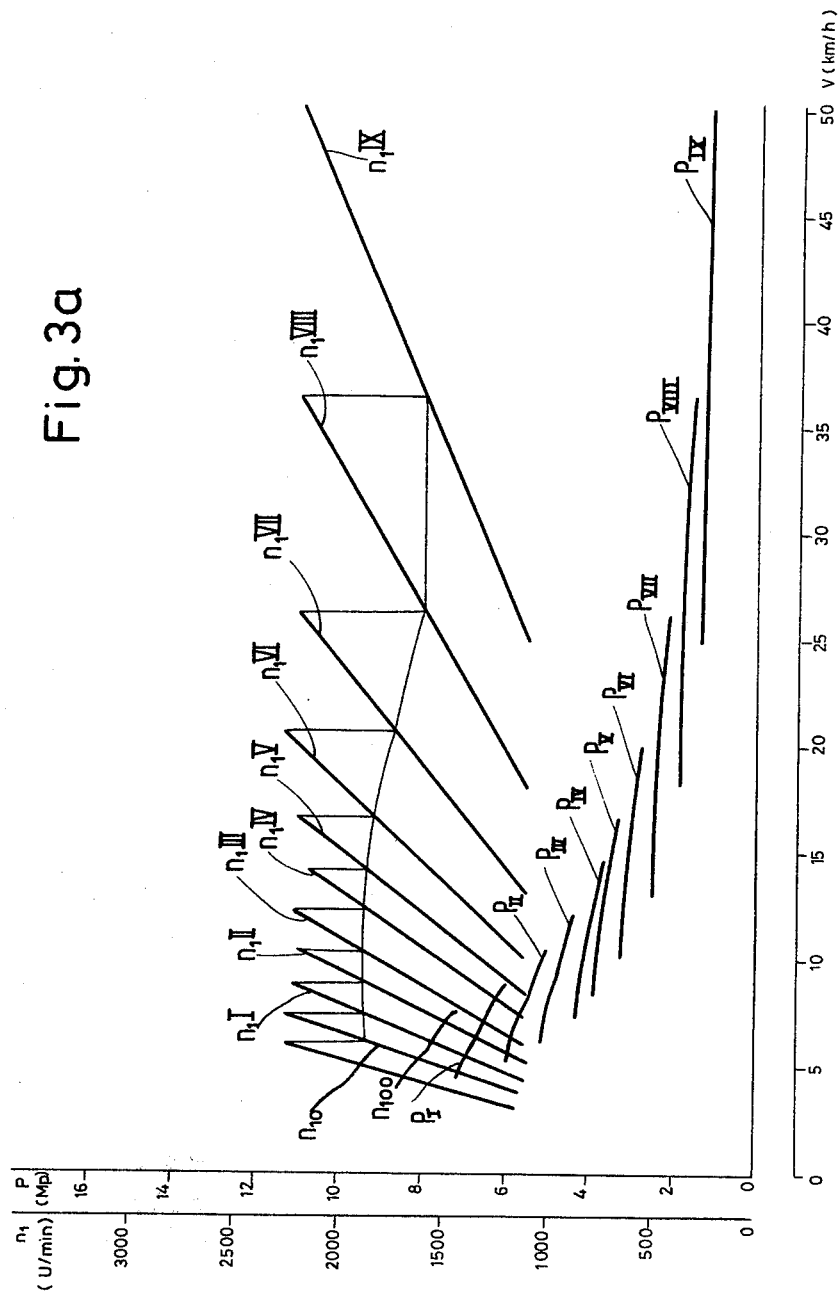

MULTIPLE SPEED DOUBLE PLANETARY GEAR TRANSMISSION

This invention relates to multi-speed gear arrangements, especially of a type adapted for trucks, lorries and earth-moving equipment. Passenger cars have a high specific power, and therefore when using a hydraulic torque converter with a passenger car, it is normally sufficient to use in combination therewith two or three gear steps, both for acceleration and climbing, and to obtain through the torque converter direct drive lock-up and sufficient engine braking on down-hill runs. However, in the case of vehicles having a lower specific power, even if they have a lower top speed, it is necessary to have many more gear steps to assure that the engine can be used as close to maximum power (horsepower) as possible over a wide speed range and to maintain the highest possible average speed. Mechanical gears for such applications are normally synchromesh transmissions designed to provide a sufficient number of correctly spaced gear ratios. These transmissions have a large number of highly loaded dog clutches with synchronizing arrangements together with a release coupling of the friction type to cut-off the torque transmission during shift periods. When using the combination of hydrodynamic torque converters and planet gears, the planet gears have been larger than the normal synchromesh transmissions and to provide reverse gear they have had an additional planet gear. The dimensions, weights and manufacturing costs of such gears are quite large.

It is a purpose of the present invention to provide a multiple speed multi-step gear transmission for trucks, lorries and earth-moving equipment, which is relatively simply to manufacture, compact in size and includes a large number of properly related gear steps including a reverse gear, and which transmission does not need special release couplings except the power shift arrangements.

This purpose of the present invention is achieved by providing a pair of multiple speed planetary gears, referred to also as "planetary gear arrangements", connected in series, each planetary gear arrangement of the series having only a single planet carrier, each of which carrier has mounted on each of its planet shafts at least two gear surfaces of different diameters, wherein the gear surfaces of each planet shaft engage at least three annular gears. The term "annular gear", as used herein refers to either a sun gear or a ring gear. One of the annular gears is a drive annular gear forming the drive connection with the input member of that planetary gear arrangement wherein the planet carrier is operatively engaged with the output member of that planetary gear arrangement. All of the annular gears except the said drive annular gear of each planetary gear arrangement are connectable to the casing by means of a servo-motor mounted in the casing and operable to engage a friction brake associated with that annular gear.

By using one of the annular gears, i.e. the drive annular gear, as the drive input to that planetary gear, and by having the planet carrier as the connection to the secondary or output shaft thereof, and by having the said two different diameter gear surfaces on each planet gear engaged with the said remaining annular gears, it is possible to make the brakes for such annular gears of a relatively large diameter, so that it is possible to use an air bearing effect to reduce the drag torque and give sufficient surface area for shifts between the gear steps without the surfaces of the brake discs too close to each other. Further, since all of the servo-motors for the brakes are mounted in the casing, it becomes more simple to provide seals which will not leak, whereby it is further possible to use only small oil quantities with a high pressure build up. Further, with this type of planetary gear transmission, it is possible to provide a reverse gear as required.

To increase the number of gear steps in each planetary gear, as well as in the overall system of two planetary gears in series, and to provide a direct drive in each planetary gear, in a preferred embodiment of the invention, friction clutches are provided between the primary and secondary sides of each planetary gear, i.e. between the drive annular gear and the planet carrier. These direct drive friction clutches are actuated by servo-motors mounted stationarily within the casing, and mounted such that the force thereof passes over thrust bearings and act on a lever system operatively connected to cause engagement of the friction clutches. This is especially advantageous since neither the bearings nor the annular gears are loaded either while the direct drive connection is being made or while driving in direct drive. This will obviously save wear on the gear surfaces.

In accordance with a first embodiment of the invention, the primary gear, i.e. the drive annular gear of the first planetary gear in the direction of flow of power, operatively engages the largest of the planet gear surfaces, and this drive annular gear is preferably a ring gear. Concurrently, the primary gear or drive annular gear in the second planetary gear is a sun gear in mesh with the smaller diameter gear surface. This arrangement provides a larger number of gear steps. Such a transmission is especially suitable for earth-moving equipment because for such applications, the steps of the gears at low speed must be close to each other while at high speeds the gears are used for transport purposes. The presently described embodiment may have, in a practical form of the invention, up to nine forward gear ratios, including direct drive and a reverse gear.

Another embodiment of the invention is preferred for use in trucks, lorries or the like. In this embodiment the primary gear or drive annular gear of both planetary gears of the system are ring gears in mesh with the larger diameter gear surface of their respective planet gears. In this arrangement the gear steps in low speed are larger than in the first described embodiment and the steps are smaller in the higher speeds, these characteristics being desirable for trucks and lorries. The number of useful combinations of gear ratios in the entire system are closer together so that only six are used. This however is normally quite sufficient. A larger number of useful gear steps can of course be provided if the planet gears, instead of having only two gear surfaces, have three gear surfaces thereon, each of a different diameter.

In each of the planetary gears, means are provided for connecting the primary gear, i.e. the drive annular gear to the planet carrier for a direct drive connection. Also, as noted above, each of the remaining sun and ring gears are connectable to the casing by brakes. With this arrangement there is provided in accordance with one advantageous feature of the invention an arrangement whereby the force from the stationary servo-motor operable to engage the direct drive friction clutch transmits its force from its servo-motor through one of the sun gears which slides axially and over one or two axial force thrust bearings, whereby the sun gear, acting across said bearings, moves a lever mechanism which in turn causes engagement of the direct drive friction clutch.

In many cases it is necessary to have a high gear ratio in reverse. This is also possible according to the present invention by providing three gear surfaces of different diameters on each planet shaft, and by providing a ring gear in mesh with the outer side of the smallest gear surface and by stalling this ring gear relative to the casing. It is also possible to provide a further sun gear in engagement with this third smaller gear surface to provide a further gear ratio for use with the primary or drive annular gear, which adds three gear ratios to the number of gear ratios available in the entire system.

The friction brakes may be single disc brakes, or in the case of power shift arrangements, they may include a plurality of discs.

The objects and advantages of the invention will become apparent from the detailed description to follow, together with the accompanying drawings wherein:

FIG. 1 is an axial longitudinal sectional view through a first embodiment of a multi-speed gear according to the present invention, particularly adaptable for earth-moving equipment.

FIG. 1a is a diagram relating to the embodiment of FIG. 1, and representing the tractive effort and engine speed for the various gear steps plotted against the driving velocity of the vehicle in an earth-moving vehicle which is also capable of traveling at high velocity between the individual operating sites.

FIG. 2 is an axial, longitudinal sectional view through a second embodiment of a multi-speed gear of the present invention, particularly suitable for a truck or lorry.

FIG. 2a is a diagram similar to FIG. 1a for a motor lorry.

FIG. 3a is a diagram similar to FIG. 1a but corresponding to the embodiment of FIG. 3.

Referring now to the drawings, like elements are represented by like numerals throughout the several views.

Figure 3:
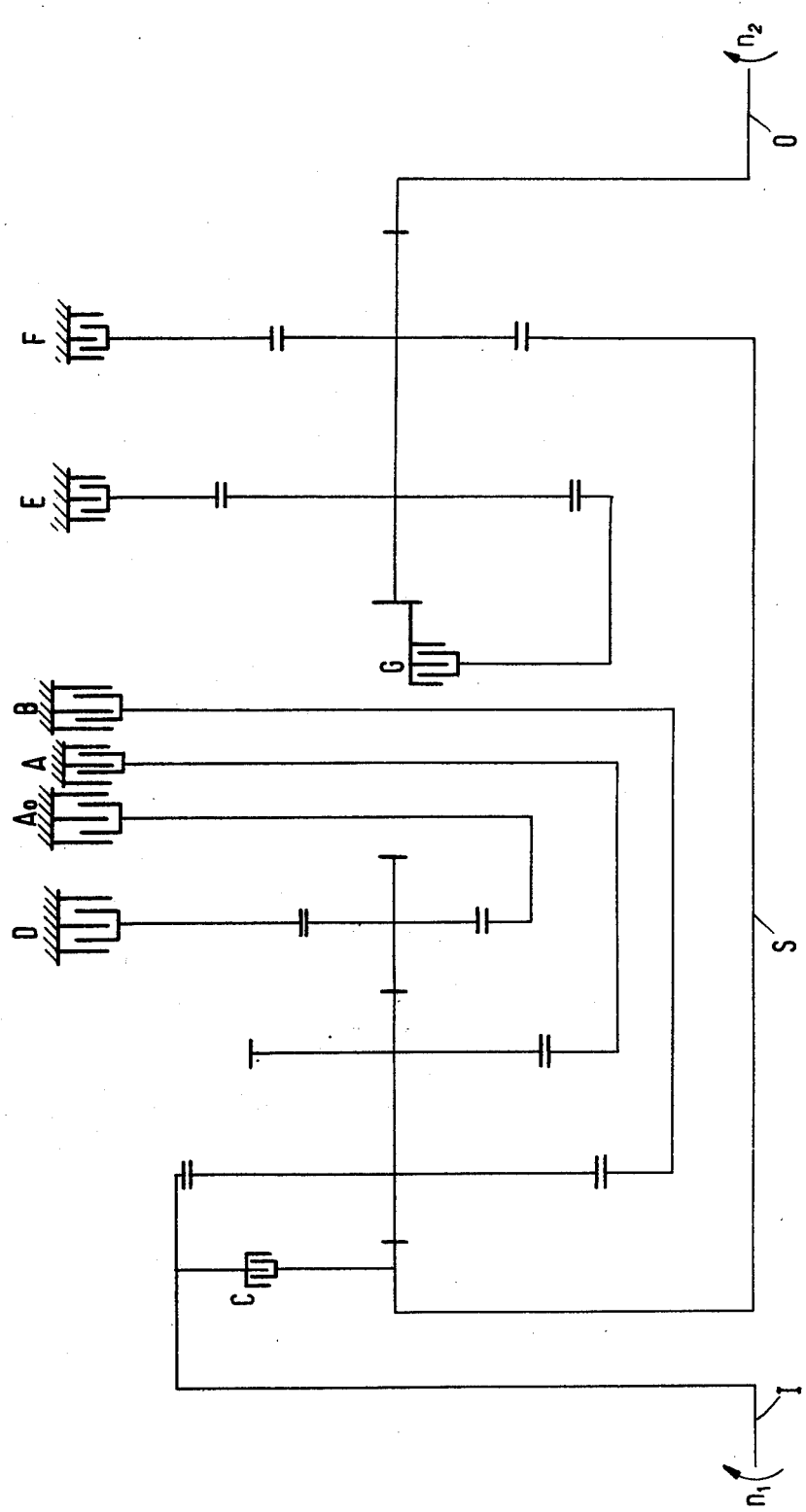
FIG. 3 is a schematic representation of another embodiment of the invention which is similar to that shown in FIG. 1 but modified such that the first planetary gear has planet shafts with three gear surfaces of different diameters, each meshing with a sun gear and/or a ring gear.

In all the embodiments of the multiple speed gear transmission according to the invention illustrated in the drawings, the input shaft is indicated by the reference I, the output shaft by O, an intermediate shaft between the two planetary gears by S and the non-rotatable casing, where shown, by H.

In the embodiment of the transmission shown in FIG. 1, the two shafts I and O are mounted in the casing H by means of ball bearings 10 and 12, respectively, and the input shaft I which extends over almost the whole length of the transmission is centered by means of a roller bearing 16 in a bore in the short output shaft O. The hollow intermediate shaft S encloses the input shaft I over most of its length and its front end is mounted on the input shaft I by means of a needle bearing 14 and its rear end is mounted on I by a friction bearing 17. The casing H contains two planetary gears P1a and P1b which are separated from each other by a casing middle portion M formed by a partition and numerous non-rotatable servo-motors.

The planetary gear P1a on the left will be described first: A radial flange 18 on the intermediate shaft S is splined to carry a planet carrier 20 which has first planet gear wheels 24 of relatively small diameter mounted on its shafts 22 which are distributed over its circumference. Only one shaft 22 and planet gear wheel 24 can be seen in the plane of the drawing. Mounted on each gear wheel 24 is a second gear wheel 26 in positive engagement with gear wheel 24 by means of a splined bore. Gear wheel 26 has a substantially larger diameter but is much shorter axially than gear wheel 24 so that it leaves a considerable portion of the smaller wheel 24 exposed, wheels 24 and 26 thus forming a planet gear having two gear surfaces of differing diameters.

A slightly conical disc 28 is non-rotatably fixed on the input shaft I by splines. The periphery of this disc 28 engages in a locking manner with the internal teeth of a first annular gear 30 which is in the form of a sleeve. The internal teeth which extend over the whole length of this gear 30 mesh at their other end with the larger planet wheels 26 for which the annular gear 30 thereby forms a ring gear. A second annular gear 32 in the form of a sleeve is centered on the intermediate shaft S and meshes as a sun gear with the larger planet wheels 26. A third annular gear 34, which is also in the form of a sleeve, is mounted on a flange disc 36 which has been pushed over the front end of the sun gear 32 and non-rotatably fixed to it by splines. This annular gear 34 functions as sun gear meshing with the smaller planet wheels 24. The third annular gear 34 also carries a flange disc 38 which is fitted on it by splines. Lastly, a fourth annular gear 40 functions as ring gear which encloses the small planet wheels 24 on their outer side and meshes with them.

The flange disc 38 has an external toothing on which it carries the only friction disc 42 of a first disc brake A for fixing the sun gear 34 to the casing H. The disc brake A is shifted into engagement by means of a ring piston 44 which is biassed in the direction of disengagement by a Belleville spring 46. The flange disc 36 similarly carries the single friction disc 48 of a second disc brake B for fixing the sun gear 32 to the casing H by means of a ring piston 50 which is biassed in the direction of disengagement by a Belleville spring 52. The ring pistons 44, 48 are displaceably mounted in annular cylindrical recesses within the middle portion M of the casing and the Belleville springs 46, 52 bear against axial projections in the interior of the casing.

Another ring piston 54 is arranged on a relatively small diameter in a third annular cylindrical recess within the casing middle portion M. This ring portion 54 acts by way of a first thrust bearing 56 on the sleeve shaped sun gear 32 which is not only rotatable but also axially displaceable on the intermediate shaft S. The other end of the sun gear 32 acts by way of a second thrust bearing 58 on a number of spacer pins 60 which are supported to be axially displaceable in bores formed in the radial flange 18 of the intermediate shaft S. In the example illustrated, the thrust bearings 56, 58 are needle bearings with relatively short needles but other suitable types of bearings may equally well be used, in particular the bearing 56 may be a friction bearing and the bearing 58 a deep row ball bearing.

The pins 60 bear axially against a thrust ring 62 which is displaceable on the intermediate shaft S. The thrust ring 62 engages with the inner ends of numerous radial levers 64 which extend through slots with beaded edges formed in a collar 66 on the planet carrier 20. The shorter lever arms situated radially outside these slots engage in a form of locking manner with another thrust ring 68. This thrust ring 68 clamps a friction disc 70 fixed in the ring gear 30 and thus together with this disc 70 it forms a disc clutch C between the ring gear 30 and planet carrier 20 for directly connecting the input shaft I with the output shaft O for direct drive. It will be seen that this disc clutch is engaged by pressure acting on the ring piston 54. The clutch is disengaged by means of a Belleville spring 72 which is screwed to the radial levers 64 and tends to swing the levers into a position perpendicular to the axis of the transmission and keeps the thrust bearings constantly under load.

Lastly, the non-rotatable casing H has another annular cylindrical recess containing a piston 74 by means of which a friction disc 76 situated on the external toothing of the ring gear 40 can be fixed to the non-rotatable casing to form another disc brake D.

The planetary gear P1b differs from planetary gear P1a mainly in that the input member, i.e. the driving annular gear connected to its input shaft, namely in this case the intermediate shaft S, is not a ring gear but a sun gear 78 which meshes with the smaller diameter wheels of the planet gears. These planet wheels 80 are again formed by relatively long gear wheels which are mounted on shafts 82 of a planet carrier 84 which in turn is screwed to a flange on the output shaft O. Gear wheels 86 of larger diameter are pushed over the aforesaid gear wheels 80 and form the larger wheels of the planet gears. Each of the brakes A, B and D include reaction members 44a, 50a and 74a, respectively, fixed against rotation relative to the casing.

In order to obtain two different reduction ratios from the planetary gear P1b, a ring gear 88 is provided to mesh with the larger planet wheels 86 and a ring gear 90 is provided to mesh with the smaller planet wheels 80. The ring gears 88 and 90 carry friction discs 92 and 94, respectively, by means of which they can be fixed to the transmission casing H by the ring pistons 96 and 98, respectively, to form one-disc brakes E and F. Another sun gear 102 is formed by a toothed sleeve mounted on the intermediate shaft S and carries, non-rotatably fixed to it, a flange disc 104 which carries the only friction disc 106 of a friction clutch G for connecting the sun gear 102 to the planet carrier 84 by means of a thrust ring 110 to form a direct drive connection. To operate the friction clutch G, a ring piston 112 axially displaceable inside an annular cylinder is provided at the driving end of the planetary gear P1b. This ring piston 112 is capable of axially displacing a thrust ring 116 by way of a thrust bearing 114 designed as a needle bearing. The thrust ring 116 engages the inner ends of radial levers 118 which are formed by inwardly directed spokes extending from a Belleville spring 120 which bears at its periphery against an abutment 122 in the planet carrier 84 and, radially inwards of this position, engages an annular projection on the thrust ring 110. It is obvious that by this construction the pressure exerted by the ring piston 112 to press the thrust ring 110 against the friction disc of the clutch 106 is greatly reinforced. Since in addition, in contrast to the arrangement in the planetary gear P1a, the servo-motor formed by the ring piston 112 is situated at the driving end of the planetary gear P1b and the sun gear 102 which is required to be fixed to the planet carrier 84 for direct drive is also situated there, it becomes unnecessary to use a sun gear as an axially displaceable power transmission element for operating the direct drive clutch as in the planetary gear P1a.

Table I below shows the combinations of certain pairs of brakes and/or clutches in engagement at the same time for producing nine forward gears indicated by Roman numerals and one reversing gear R. The second and fourth columns give the transmission ratios of the first and second planetary gear, respectively, while the last column shows the overall transmission ratio obtained.

TABLE I

| A | 1.910:1  | E | 3.000:1 | I    | 5.730:1  |
|---|----------|---|---------|------|----------|
| A | 1.910:1  | F | 2.500:1 | II   | 4.775:1  |
| B | 1.375:1  | E | 3.000:1 | III  | 4.125:1  |
| B | 1.375:1  | F | 2.500:1 | IV   | 3.438:1  |
| C | 1.000:1  | E | 3.000:1 | V    | 3.000:1  |
| C | 1.000:1  | F | 2.500:1 | VI   | 2.500:1  |
| A | 1.910:1  | G | 1.000:1 | VII  | 1.910:1  |
| B | 1.375:1  | G | 1.000:1 | VIII | 1.375:1  |
| C | 1.000:1  | G | 1.000:1 | IX   | 1.000:1  |
| D | −0.535:1 | E | 3.000:1 | R    | −1.605:1 |

FIG. 1a is a diagram representing the variation in the transmission input speed of rotation $n_1$ and tractive force P in relation to the velocity of the vehicle in the nine forward gears I to IX when the when the multiple speed gear according to FIG. 1 is used in a motor lorry. The vertical lines between the input speed curves give the points at which it is suitable to change gears between the individual forward gears. It can be seen that the revolution speed curves are very close together in the lower gears. This means that when the vehicle is traveling at relatively low speeds and the tractive force is correspondingly high it is possible to operate within a relatively narrow range of input revolution speeds, at which the engine produces its maximum torque. The multiple speed planetary gear shown in FIG. 1 is therefore capable of optimally adapting to the different demands of tractive power and traveling velocity encountered in an earthmover.

The transmission according to FIG. 2, which is mainly intended for motor lorries, comprised two planetary gears P2a and P2b which are basically similar in construction and in which, as in the first planetary gear P1a of the embodiment according to FIG. 1, the input members are formed by external ring gears which mesh with the larger diameter wheels of the planet gears. In this case, however, the additional ring gear which meshes with the planet wheels of smaller diameter and can be braked for producing reversing drive is only provided in the first planetary gear P2a.

Furthermore, the arrangement according to FIG. 2 contains certain structural alterations compared with FIG. 1 but these are immaterial to the invention and the two planetary gears P1a and P1b of FIG. 2 therefore need not be described in detail. It merely needs to be pointed out that in view of the fact that the arrangement according to FIG. 2 is to be used in a heavy motor lorry, the friction brakes and clutches are equipped with multiple discs. Also, since in this case the driving annular gear of planetary gear P2b is a ring gear, this requires that the intermediate shaft S be somewhat shorter and supported by the output shaft O closer to the front than in the embodiment of FIG. 1, namely at bearing 16a.

Using a designation for the brakes and clutches A' to G' analogous to that used in FIG. 1, the gear combinations obtainable in practice from the construction according to FIG. 2 are shown below:

TABLE II

| | | | | | |
|---|---|---|---|---|---|
| B' | 2.45:1 | E' | 2.15:1 | I | 5.27:1 |
| B' | 2.45:1 | F' | 1.29:1 | II | 3.16:1 |
| A' | 1.00:1 | E' | 2.15:1 | III | 2.15:1 |
| C' | 1.29:1 | F' | 1.29:1 | IV | 1.66:1 |
| A' | 1.00:1 | F' | 1.29:1 | V | 1.29:1 |
| A' | 1.00:1 | G' | 1.00:1 | VI | 1.000:1 |
| D' | −1.16:1 | E' | 2.15:1 | R | −2.50:1 |

The other possible combinations B'-G', C'-E'; and C'-G' are not used in practice since B'-G' and C'-E; are too close to A'-E' and B'-F', respectively, while C'-G' in fact produces the same overall reducing ratio as A'-F'. Instead, the effect achieved with the given choice of combinations is that the intermediate shaft is subjected to the minimum of loads at the various reducing steps I to V since the second planetary gear P2b always takes part in the reduction and its direct clutch G is connected only in the direct drive gear speed VI.

FIG. 2a is a diagram again showing the variation in transmission input speed of rotation $n_1$ and tractive force P in relation to the traveling velocity at the six forward gear speeds I to VI when using a transmission according to FIG. 2 in a motor lorry. The diagram clearly shows the much coarser grading of the engine speed and tractive force in the region of lower traveling velocities compared with the results obtained with the transmission according to FIG. 1.

FIG. 3 represents schematically a modified embodiment of the transmission of FIG. 1. The difference is that in this case the planet gears of the first planetary gear (on the left in FIG. 3) have a third gear surface of smallest diameter which meshes with the second ring gear designed to be braked by the brake D for reversing gear and with an additional sun gear designed to be braked by an additional brake $A_0$. The purpose of this arrangement is to obtain an even higher reducing ratio for reverse gear and to obtain additional extremely high reducing ratios in forward drive, as represented by the revolution curves $n_{10}$ and $n_{100}$ in FIG. 3a. For reversing one obtains a reducing ratio of about 5:1 while the additional reducing ratios for forward drive are 8.4:1 and 7:1.

The multiple speed planetary gear according to the present invention may be used alone or connected in series with a hydrodynamic torque converter having one-and-a-half stages or two stages. The planetary gear of the present invention is particularly suitable for use with a torque converter having a releaseable pump member of the type as shown in U.S. Pat. No. 3,893,551 or with a torque converter of the type having a releaseable turbine member as shown for example in U.S. Pat. No. 3,839,864.

Although the invention has been described in considerable detail with respect to preferred embodiments thereof, it will be apparent that the invention is capable of numerous modifications and variations apparent to those skilled in the art, without departing from the spirit and scope of the invention, as defined in the claims.

We claim:

1. A multiple speed gear transmission comprising: a stationary casing, first and second planetary gear arrangements, each having an input member and an output member, said planetary gear arrangements connected in series with the output member of the first planetary gear arrangement drivingly engaged with the input member of the second planetary gear arrangement, each such arrangement including; a planet carrier carrying a planet gear shaft and at least two gear surfaces of different diameters thereon, said planetary gear carrier engaging with said output member, a drive annular gear for engaging the input member, and at least two remaining annular gears also in engagement with the planet gear surfaces, a friction brake and a corresponding servo-motor associated with each of said remaining annular gears, the first planetary gear arrangement including a direct drive friction clutch and including a servo-motor for operating same, all of said friction brakes and said friction clutch being the disc type, said servo-motors being stationarily mounted against rotation in the stationary casing, and each servo-motor associated with a friction brake being operable to engage its said friction brake to close it to fix its respective annular gear against rotation relative to the casing, and a lever positioned to engage the direct drive friction clutch to close it, and thrust bearings operatively located between the direct drive friction clutch and its respective servo-motor, said direct drive servo-motor transmitting its force across the thrust bearings to turn the lever to cause engagement of the direct drive friction clutch.

2. A multiple speed gear transmission according to claim 1, including a spring means for urging said direct drive clutch to the disengaged position and concurrently loading said axial thrust bearings.

3. A multiple speed gear transmission according to claim 1, wherein the drive annular gear of the first planetary gear arrangement which engages the input member is a ring gear engaging the larger diameter gear surface, and wherein the drive annular gear of the second planetary gear arrangement which engages its input member is a sun gear engaging the smaller gear surface.

4. A multiple speed gear transmission according to claim 3, wherein at least one of the planetary gear arrangements includes on its planetary gear shafts a third gear surface of a diameter less than the first two gear surfaces, and including an annular gear engaging said third gear surface on the opposite side, taken radially, as the drive annular gear.

5. A multiple speed gear transmission according to claim 4, wherein the drive annular gear of the planetary gear arrangement having three gear surfaces is a ring gear, the third gear surface is provided on the planet shafts of the first planetary gear arrangement, and wherein the annular gear engaging the third gear surface of the first planetary gear arrangement is a sun gear.

6. A multiple speed gear transmission according to claim 3, said remaining annular gears of the first planetary gear arrangement including two sun gears, one engaging each of the two said gear surfaces.

7. A multiple speed gear transmission according to claim 6, including a ring annular gear engaging the smaller gear surface of at least the first planetary gear arrangement for reverse drive.

8. A multiple speed gear transmission according to claim 3, the first planetary gear arrangement output member including an intermediate shaft extending axially beyond the first planetary gear arrangement, and drivingly engaging with the input member of the second planetary gear arrangement, and wherein the second planetary gear arrangement is journalled on the intermediate shaft.

9. A multiple speed gear transmission according to claim 8, the casing including a stationary portion between the first and second planetary gear arrangements, and at least some of said servo-motors mounted in said partition.

10. A multiple speed gear transmission according to claim 3, wherein the friction brakes are single disc friction brakes.

11. A multiple speed gear transmission according to claim 1, wherein the drive annular gear of each planetary gear arrangement is a ring gear.

12. A multiple speed gear transmission according to claim 11, wherein both of the drive annular gears which are ring gears engage the larger diameter gear surfaces.

13. A multiple speed gear transmission according to claim 12, said remaining annular gears of each planetary gear arrangement including two sun gears, each engaging one of the two gear surfaces.

14. A multiple speed gear transmission according to claim 13, wherein one of the planetary gear arrangements includes a further ring annular gear engaging the smaller gear surface for reverse drive.

15. A multiple speed gear transmission according to claim 11, the first planetary gear arrangement output member including an intermediate shaft extending axially beyond the first planetary gear arrangement, and drivingly engaging the drive annular gear of the second planetary gear arrangement, and wherein the output member of the second planetary gear arrangement is rotatively journalled on the said intermediate shaft.

16. A multiple speed gear transmission according to claim 15, the casing including a stationary partition between the first and second planetary gear arrangements, and at least some of the said servo-motors mounted in said partition.

17. A multiple speed gear transmission according to claim 11, said friction brakes being multiple disc friction brakes.

18. A multiple speed gear transmission according to claim 1, the second planetary gear arrangement having a second direct drive friction clutch operable to connect its planet carrier and its drive annular gear together for direct drive, and including a second direct drive servo-motor non-rotatively mounted in the casing for operating said second direct drive clutch.

19. A multiple speed gear transmission according to claim 18, wherein the second planetary gear arrangement also includes a thrust bearing and a lever through which the second servo-motor acts to operate its respective direct drive friction clutch.

20. A multiple speed gear transmission according to claim 1, wherein each friction brake includes a reaction member opposed to its respective servo-motor, and wherein all of said reaction members are fixed against rotation relative to the stationary casing.

21. A multiple speed gear transmission according to claim 1, wherein at least one of the planetary gear arrangements includes on its planetary gear shafts a third gear surface of a diameter less than the first two gear surfaces, and including an annular gear engaging said third gear surface on the same radial side as the drive annular gear to provide a reverse drive having a high reduction ratio.

22. A multiple speed gear transmission according to claim 21, said drive annular gear of the first planetary gear arrangement being a ring gear, the third gear surface being provided in the first planetary gear arrangement, and the annular gear in engagement with the third gear surface for reverse drive is also a ring gear.

23. A multiple speed gear transmission according to claim 1, wherein one of the remaining annular gears of the first planetary gear arrangement is mounted for axial movement and supported laterally by said thrust bearings, wherein the direct drive servo-motor acts through the axially movable remaining annular member to turn the lever and engage the direct drive friction clutch.

24. A multiple speed gear transmission according to claim 23, said drive annular gear of the first planetary gear arrangement being an outer ring gear, and the axially movable remaining annular gear through which the force of the direct drive servo-motor passes being an annular sun gear.

25. A multiple speed gear transmission according to claim 24, said second planetary gear arrangement including thrust bearings for mounting of one its said remaining annular gears for axial movement, the force path from the second direct drive servo-motor to the second direct drive clutch being operable to move said axially movable annular gear and passing through said thrust bearings.

* * * * *